United States Patent Office 2,884,399
Patented Apr. 28, 1959

2,884,399
COMPOSITIONS COMPRISING PERFLUOROCHLOROOLEFIN HOMOPOLYMERS AND TETRAESTER PLASTICIZERS

William S. Barnhart, Cranford, and Robert H. Wade, West Paterson, N.J., assignors, by mesne assignments, to Minnesota Mining and Manufacturing Company, St. Paul, Minn., a corporation of Delaware No Drawing. Application November 23, 1954
Serial No. 470,811

23 Claims. (Cl. 260—31.4)

This invention relates to perfluorochloroolefin polymers. In one of its aspects this invention relates to novel additives for improving the melt viscosity and plasticizing of the perfluorochloroolefin polymers.

The perfluorochloroolefin polymers, because of their unique physical and chemical properties, are widely used in many industrial applications. Physically, these polymers possess high thermal stability and good electrical characteristics. Chemically, these polymers are resistant to most corrosive chemicals. Due to this combination of excellent physical and chemical characteristics, the perfluorochloroolefin polymers are fabricated into a variety of useful end items by appropriate molding techniques. Thus, valve seals, gaskets, electrical insulators, tubing and other items are available today.

The thermoplastic perfluorochloroolefin polymers are characterized by a relatively high melt viscosity which does not appreciably change with temperature. For example, the melt viscosity of a normally solid thermoplastic homopolymer of trifluorochloroethylene remains substantially constant over a temperature range between 440° F. and 540° F. Because of the high melt viscosity, correspondingly high molding temperatures must be employed. However, these molding temperatures are so high that great care must be exercised to avoid thermal degradation of the polymer which occurs when the polymer is maintained at an elevated temperature for more than a short period of time. The high temperature necessary to mold the perfluorochloroolefin polymers combined with the dangers of thermally degrading the polymers at these temperatures makes molding a very difficult operation.

It is an object of this invention to improve the melt viscosity of normally solid perfluorochloroolefin polymers.

It is another object of this invention to provide plasticized perfluorochloroolefin polymer compositions which can be readily molded.

It is still another object of this invention to provide additives which lower the melt viscosity of the perfluorochloroolefin polymers.

It is one of the more particular objects of this invention to improve the molding characteristics of normally solid polymers of trifluoro chloroethylene by the addition of plasticizers which lower the melt viscosity.

Various other objects and advantages of the present invention will be apparent to those skilled in the art from the accompanying description and disclosure.

In general, the above objects are accomplished by mixing with the perfluorochloroolefin polymer a quantity of a tetraester. Representative of the perfluorochloroolefin polymers are trifluorochloroethylene and symmetrical and unsymmetrical dichlorodifluoroethylene. The perfluorochloroolefin homopolymers, such as a homopolymer of trifluorochloroethylene which are improved by the tetraesters of this invention have a no strength temperature (NST) of at least 220° C. preferably above 250° C. The term polymer as used herein includes homopolymers and copolymers.

The tetraesters of this invention are prepared by transesterifying an alcohol, a dicarboxy compound and a dihydric compound. The alcohols which are used in preparing the tetraesters of this invention, are the aliphatic, alicyclic and heterocyclic alcohols having from 3 to 18 carbon atoms. Representative of the preferred alkyl alcohols, are amyl, hexyl, heptyl, octyl, nonyl, and decyl alcohols. Representative of the preferred cyclic alcohols, are cyclobutanol, cyclopentanol, cyclohexanol, cycloheptanol and cyclooctanol. Representative of the heterocyclic alcohols, are furfuryl alcohol, tetrahydrofurfuryl alcohol and the methyl and dimethyl substituted tetrahydrofurfuryl alcohols. The dicarboxy compounds which are employed in preparing the tetraesters of this invention, are the alkylene, alkylene ether, alkylene thioether, and aromatic dicarboxylic acids which contain from 2 to 10 carbon atoms and preferably dicarboxylic acids, such as adipic acid, pimelic acid, suberic acid, azelaic acid, sebacic acid, phthalic acid and thiodiglycolic and diglycolic acid. The dicarboxylic acids are preferably used in the form of their lower alkyl esters, for reasons which will be discussed hereinbelow. The dicarboxylic acids and their lower alkyl esters which are used in the preparation of the tetraesters of this invention have the general formula $R_1$—OOC—R—COO—$R_1$ in which $R_1$ is hydrogen or an alkyl radical such as methyl or ethyl. When used in the form of their esters, the dicarboxylic acid ester contains between 6 and 14 carbon atoms. The dihydric compounds which are used, are the alkylene diols, alkylene ether diols, and alkylene thioether diols having from 2 to 8 carbon atoms and preferably having one hydroxy group at each end of the chain and where the chain is branched at each end of the longest chain. Representative of the preferred dihydric compounds, are ethylene glycol, 2-methyl-1,3-propane diol, 1,4-butane diol, 1,5-pentane diol, 2-methyl-1,5-pentane diol and the polyethylene glycols, such as diethylene glycol, triethylene glycol and thiodiethylene glycol.

When the above described reactants, i.e., the alcohol, dicarboxylic acid or lower alkyl acid ester and dihydric compound are transesterified, a product is obtained which has the formula

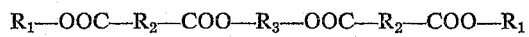

$$R_1\text{—OOC—}R_2\text{—COO—}R_3\text{—OOC—}R_2\text{—COO—}R_1$$

Depending on the starting materials, $R_1$ can be an alkyl, an alicyclic or a heterocyclic radical having from 3 to 18 carbon atoms, usually between 4 and 12 carbon atoms and preferably between 5 and 10 carbon atoms. $R_2$ can be either an alkylene, alkylene thioether, alkylene ether, or a divalent aromatic radical. $R_3$ can be either alkylene, alkylene ether or an alkylene thioether radical. The preparation of the tetraester of the above formula is achieved by mixing the reactants in a mole ratio of alcohol to dicarboxy compound to dihydric compound of approximately 1:1:0.5. Slight deviations from this mole ratio can be tolerated but marked deviations only increase the quantity of side products and should be avoided. The mole ratio is therefore maintained within about 20% of the indicated quantity of each reactant. The reaction is preferably carried out in the presence of a trace of metallic sodium which serves to catalyze the reaction. As indicated, previously, the reaction is preferably carried out using the dicarboxylic acid in the form of its ethyl or methyl ester since in this case, alcohol is split off rather than water which permits the reaction to be carried out much more readily. The reactants are charged to a transesterification apparatus and heated for a period of time between about 12 and about 24 hours at reduced pressure, that is, about 100 to 200 mm. of mercury, under reflux conditions. When the esterification is complete, the temperature is raised and the pressure is reduced to remove low boiling products. The residue is recovered for use.

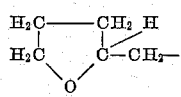

In order to illustrate the preparation of the tetraesters of this invention, the following examples are presented.

EXAMPLE I 65 gms. (0.5 m.) of n-octyl alcohol (B.P. 194° C.), 117 gms. (0.5 m.) of diethyl sebacate (B.P. 306° C.), 26 gms. (0.25 m.) of pentamethylene glycol (B.P. 240° C.), and a trace of metallic sodium were charged to an esterification apparatus. The mixture was then heated for 16 hours at from 70 to 150° C. under 100–200 mm. of pressure. At the end of this time, pressure was reduced to 0.08 mm. to strip off low boiling products. A tetraester was obtained in 92 percent yield. The molecular weight of the tetraester is about 700 and the formula is:

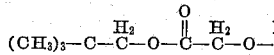

A variety of tetraesters are prepared, using the procedure described in Example I, as follows:

EXAMPLE II 102 gms. (1 m.) of hexyl alcohol (B.P. 156.4° C.), 216 gms. (1 mole) of ethyl pimelate (B.P. 152° C.), 90 gms. (0.5 m.) of tetramethylene glycol (B.P. 230° C.) and a trace of metallic sodium are charged to an esterification apparatus where they are heated for about 16 hours at a temperature from 50° C. to 120° C. and a pressure from 100–200 mm. after which pressure is reduced to below 1 mm. to remove low boiling products. A thick greasy tetraester having a molecular weight of about 542 is obtained. The formula of the tetraester is:

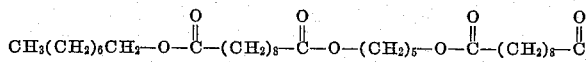

EXAMPLE III 100.1 gms. (1 m.) of cyclohexanol (B.P. 161.5), 45 gms. (0.5 m.) of 1,4-butane diol (B.P. 230° C.), 165 gms. (1 m.) of phthalic acid (M.P. 206° C.) and a trace of metallic sodium are charged to an esterification apparatus in which they are heated for about 16 hours at a temperature from about 80° C. to about 160° C. at a pressure about 100–200 mm. after which the pressure is reduced to remove low boiling materials. A heavy tetraester having a molecular weight of about 550 is obtained. The formula of the tetraester is:

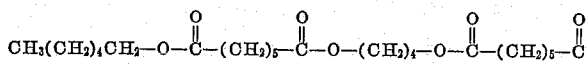

EXAMPLE IV 102.1 gms. (1 m.) of tetrahydrofurfuryl alcohol (B.P. 177), 144.2 gms. (1 m.) of ethyl azelate (B.P. 291° C.), 59 gms. (0.5 m.) of 2-methyl-2,4-pentane diol (B.P. 196° C.) and a trace of metallic sodium are charged to an esterification apparatus in which the reactants are heated for about 16 hours at a temperature from 50° C. to 120° C. and a pressure of 100–200 mm. after which pressure is reduced to below 1 mm. to boil off low boiling products. A tetraester having a molecular weight of about 626 is obtained. The formula of the tetraester is:

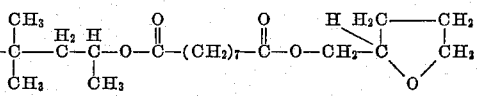

EXAMPLE V 88.1 gms. (1 m.) of 2,2-dimethyl-1-propanol (B.P. 114° C.), 134.1 gms. (1 m.) of diglycolic acid (M.P. 148° C.), and 61.7 gms. (0.5 m.) of 2,2' thiodiethanol (B.P. 168° C. at 14 mm.) and a trace of metallic sodium are charged to an esterification apparatus in which the reactants are heated for about 16 hours at a temperature from 60° C. to 130° C. and at a pressure of about 100–200 mm. after which the pressure is reduced to remove low boiling products. A tetraester having a molecular weight of about 494 is obtained. The formula of the tetraester is:

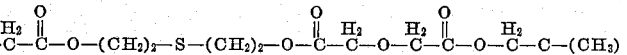

As indicated previously, the melt viscosity of the perfluorochloroolefin polymer is improved by the addition of the tetraesters of this invention. These tetraesters, which act to plasticize the perfluorochloroolefin polymer, are partially compatible with the perfluorochloroolefin homopolymers and, when used in minor proportions, lubricate the homopolymer thereby reducing its apparent melt viscosity. In improving the melt viscosity of the perfluorochloroolefin homopolymers, the tetraester is usually added in an amount between about 0.1 and about 5 weight percent based on polymer since the melt viscosity is not appreciably effected in concentrations below about 0.1 percent and is reduced below that required for optimum molding characteristics in concentrations above about 5 percent. Preferably, the tetraester is added in an amount between about 1 and about 5 weight percent.

In order to insure homogeneity the tetraester is blended with the polymer in finely divided form in suitable blending equipment such as a ball mill, pebble mill, etc. If the polymer is not finely divided then the blending operation can be effected in suitable grinding equipment, such as a Mikropulverizer.

In order to illustrate the effect of the tetraesters of this invention on perfluorochloroolefin polymers, the following examples are presented.

EXAMPLE VI

A finely divided homopolymer of trifluorochloroethyl-

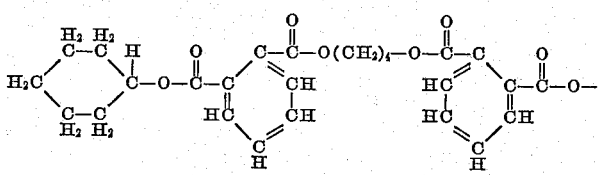

ene, no strength temperature (NST) about 300° C., was mixed with the indicated amount of the tetraester of Example I. The polymer tetraester admixture was pressed between ferrotype plates in a Carver press for 45 seconds at 2000 p.s.i. without stops. The resulting film was quenched and the area measured with a planimeter and recorded in Table I. For comparison purposes the test was repeated using the polymer without additives and with the indicated quantities of other additives.

Table I

|  | 375° F. | 425° F. | 475° F. |
|---|---|---|---|
| Homopolymer of trifluorochloroethylene. | 1.5 cm.²* | 3.0* | 4.0 |
| 2% tetraester of Example I | 4.0 | 5.0 | 6.3 |
| 5% tetraester of Example I | 6.0 | 7.4 | 12.4 |
| 2% dioctyl phthalate | Incompl. fused. | Incompl. fused. | 3.9 |
| 5% dioctyl phthlate | ----do---- | ----do---- | 5.3 |
| 10% Liquid trifluorochloroethylene telomer boiling above 275° C. at 760 mm. | ----do---- | ----do---- | 4.0 |
| 20% Liquid trifluorochloroethylene telomer boiling above 275° C. at 760 mm. | ----do---- | ----do---- | 4.0 |
| 30% Liquid trifluorochloroethylene telomer boiling above 275° C. at 760 mm. | ----do---- | ----do---- | 3.8 |
| 20% Waxy trifluorochloroethylene telomer melting above 75° C. | ----do---- | ----do---- | 3.8 |

*Incompletely fused.

EXAMPLE VII

Substantially equivalent results are obtained using the tetraesters of Examples II through V.

From the data of Table I it can be seen that a temperature of 475° F. was required for complete fusion of the homopolymer under test conditions except where the tetraester of this invention was employed. Where 2 percent by weight of tetraester was added, a plaque equivalent to that pressed at 475° F. was obtained at a temperature of 375° F. At 475° F. using 2 percent and 5 percent of tetraester respectively, the area of the plaque was 50 percent and 300 percent respectively of the area obtained without the addition of tetraester. Other additives have no appreciable effect on the melt viscosity of the homopolymer.

In addition to their use as for plasticizing and improving the melt viscosity of perfluorochloroolefin homopolymers, the tetraesters of this invention are also excellent plasticizers for the copolymers of the perfluorochloroolefins. Thus, the above described perfluorochloroolefins can be copolymerized with other halogenated olefins, such as vinyl chloride, vinylidene chloride, vinyl fluoride, vinylidene fluoride, vinylene fluoride and vinylidene fluorochloride. The addition of at least one of the tetraesters of this invention markedly improves the physical properties of these copolymers. These tetraesters are particularly suited to the plasticization of copolymers of trifluorochloroethylene and vinylidene fluoride which contain above about 20 mol percent of trifluorochloroethylene. When admixed with the above described copolymers to plasticize them, the tetraesters of this invention are used in a minor proportion( i.e., less than 50 weight percent) and preferably in an amount between about 1 and about 30 weight percent. Blending can be effected using standard blending techniques.

Various modifications and alterations of the process of this invention will be apparent to those skilled in the art and may be used without departing from the scope of this invention.

Having thus described our invention, we claim:

1. A novel composition which comprises a mixture of a homopolymer of trifluorochloroethylene having a no strength temperature above about 220° C. and between about 1 and about 5 percent by weight of the esterifcation product obtained by reacting n-octyl alcohol, diethyl sebacate, and pentamethylene glycol in a mol ratio of 1:1:0.5, said mol ratio being maintained within about 20 percent of the indicated quantity of each reactant.

2. A novel composition which comprises a mixture of a homopolymer of trifluorochloroethylene having a no strength temperature above about 220° C. and between about 1 and about 5 percent by weight of the esterification product obtained by reacting hexyl alcohol, ethyl pimelate, and tetramethylene glycol in a mol ratio of 1:1:0.5, said mol ratio being maintained within about 20 percent of the indicated quantity of each reactant.

3. A novel composition which comprises a mixture of a homopolymer of trifluorochloroethylene having a no strength temperature above about 220° C. and between about 1 and about 5 percent by weight of the esterification product obtained by reacting cyclohexanol, phthalic acid, and 1,4-butane diol in a mol ratio of 1:1:0.5, said mol ratio being maintained within about 20 percent of the indicated quantity of each reactant.

4. A novel composition which comprises a mixture of a homopolymer of trifluorochloroethylene having a no strength temperature above about 220° C. and between about 1 and about 5 percent by weight of the esterification product obtained by reacting tetrahydrofurfuryl alcohol, ethyl azelate, and 2-methyl-2,4-pentane diol in a mol ratio of 1:1:0.5, said mol ratio being maintained within about 20 percent of the indicated quantity of each reactant.

5. A novel composition which comprises a mixture of a homopolymer of trifluorochloroethylene having a no strength temperature above about 220° C. and between about 1 and about 5 percent by weight of the esterification product obtained by reacting 2,2-dimethyl-1-propanol, diglycolic acid, and 2,2' thiodiethanol in a mol ratio of 1:1:0.5, said mol ratio being maintained within about 20 percent of the indicated quantity of each reactant.

6. A novel composition which comprises a mixture of a homopolymer of trifluorochloroethylene having a no strength temperature above about 220° C. and between about 0.1 and about 5 percent by weight of the esterification product obtained by reacting a 3 to 18 carbon alcohol of the group consisting of aliphatic, alicyclic and heterocyclic monohydric alcohols, a 2 to 16 carbon compound having the general formula $$R_1\text{—OOC—R—COO—}R_1$$

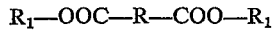

in which $R_1$ is a member of the group consisting of hydrogen and alkyl radicals and R is a member of the group consisting of alkylene, ether alkylene, thioether alkylene and divalent aromatic radicals and a 2 to 8 carbon dihydroxy compound of the group consisting of alkylene diols, alkylene ether diols, and alkylene thioether diols in a mol ratio of 1:1:0.5, said mol ratio being maintained within about 20 percent of the indicated quantity of each reactant 7. A novel composition which comprises a mixture of a thermoplastic homo polymer of trifluorochloroethylene and between about 0.1 and about 5 percent by weight of the esterification product obtained by reacting a 3 to 18 carbon alcohol of the group consisting of aliphatic, alicyclic and heterocyclic monohydric alcohols, a 2 to 16 carbon compound having the general formula $$R_1\text{—OOC—R—COO—}R_1$$

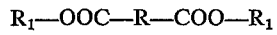

in which $R_1$ is a member of the group consisting of hydrogen and alkyl radicals and R is a member of the group consisting of alkylene, ether alkylene, thioether alkylene and divalent aromatic radicals and a 2 to 8 carbon dihydroxy compound of the group consisting of alkylene diols, alkylene ether diols, and alkylene thioether diols in a mol ratio of 1:1:0.5, said mol ratio being maintained within about 20 percent of the indicated quantity of each reactant.

8. A novel composition which comprises a mixture of a thermoplastic perfluorochloroolefin homo polymer and between about 0.1 and about 5 weight percent of the esterification product obtained by reacting an alcohol of the group consisting of aliphatic, alicyclic and heterocyclic monohydric alcohols, a compound having the general formula $R_1$—OOC—R—COO—$R_1$, in which $R_1$ is a member of the group consisting of hydrogen and alkyl radicals and R is a member of the group consisting of alkylene, ether alkylene, thioether alkylene and divalent aromatic radicals and a dihydroxy compound of the group consisting of alkylene diols, alkylene ether diols and alkylene thioether diols in a mol ratio of 1:1:0.5, said mol ratio being maintained within about 20 percent of the indicated quantity of each reactant.

9. The composition of claim 8 in which the alcohol is octyl alcohol.

10. The composition of claim 8 in which the alcohol is tetrahydrofurfuryl alcohol.

11. The composition of claim 8 in which the alcohol is cyclohexanol.

12. The composition of claim 8 in which the alcohol is hexyl alcohol.

13. The composition of claim 8 in which the alcohol is 2,2-dimethyl-1-propanol.

14. The composition of claim 8 in which the compound having the general formula $$R_1-OOC-R-COO-R_1$$

is diethyl sebacate.

15. The composition of claim 8 in which the compound having the general formula $$R_1-OOC-R-COO-R_1$$

is phthalic acid.

16. The composition of claim 8 in which the compound having the general formula $$R_1-OOC-R-COO-R_1$$

is ethyl azelate.

17. The composition of claim 8 in which the compound having the general formula $$R_1-OOC-R-COO-R_1$$

is ethyl pimelate.

18. The composition of claim 8 in which the compound having the general formula $$R_1-OOC-R-COO-R_1$$

is diglycolic acid.

19. The composition of claim 8 in which the dihydric compound is pentamethylene glycol.

20. The composition of claim 8 in which the dihydric compound is tetramethylene glycol.

21. The composition of claim 8 in which the dihydric compound is 1,4-butane diol.

22. The composition of claim 8 in which the dihydric compound is 2-methyl-2,4-pentane diol.

23. The composition of claim 8 in which the dihydric compound is 2,2' thiodiethanol.

References Cited in the file of this patent

UNITED STATES PATENTS

| | | |
|---|---|---|
| 2,647,098 | Smith | July 28, 1953 |
| 2,774,685 | Carnegie | Dec. 18, 1956 |
| 2,775,569 | Dipner et al. | Dec. 25, 1956 |